United States Patent Office 3,207,662
Patented Sept. 21, 1965

3,207,662
INSECTICIDE PRODUCTS AND METHOD OF PRODUCING SAME
A Louis de Lisle, Phoenix, Ariz.
No Drawing. Filed Oct. 7, 1959, Ser. No. 844,855
4 Claims. (Cl. 167—42)

My invention relates to insecticidal compositions and products for use in preparing such compositions. It relates also to methods of producing insecticides and insecticide products.

Insect toxicants in dilute form are normally brought into contact with insects or with areas with which the insects may come in contact, and they are normally precipitated into the areas by means of dusts or a sprayable liquid or emulsion. A general classification of insecticides may be made to include the botanicals in one category and the artificial synthetic toxicants in another category. While botanicals for the most part have been extracted from plants, synthetic analogs and homologs of such botanicals are also made and are generally classed as botanicals since they have the same kind of properties. Botanical insecticides are very numerous but only a relatively small proportion have been investigated because of assumed limitations in the use of all botanicals resulting from experience with, for example, rotenone and pyrethrum extracts. These particular botanicals, while very effective for knock down and quick kill when an insect actually comes in contact with them, have the disadvantage that they have a relatively very short residual action and tend to be destroyed by photolysis, oxidation, and hydrolysis. Still other imperfectly understood influences tend to diminish the effectiveness of the botanicals, particularly when used in certain ways.

While the completely synthetic, highly toxic substances in general have greater effectiveness, particularly over longer periods of time and have been approved for use in very dilute concentrations, they have still other marked disadvantages especially as experience is gained in their use. One of their biggest disadvantages is that, unlike most botanicals, they have a property which permits insects to develop a tolerance to them over a period of time, and in order to control these same insects it thus becomes necessary to develop either a stronger synthetic of the same general type or a toxicant based upon an entirely different structure. Still another very great objection to the poisonous insecticides of relatively recent synthesis is an apparent connection between their use and the incidence of cancer. Some have been proved to be carcinogenic and have been removed from the market. Even in dilutions at first thought to be safe they have been thought to be dangerous because of the tendency to accumulate in the body, a property which they were not known to have when their use was approved. Cattle particularly have been found by autopsy to have severe deterioration of tissue, especially in such organs as the liver, spleen, kidneys and the like, which could only be explained by the presence of relatively high concentrations of toxicants in those tissues.

One of the advantages said to be possessed by the modern toxicants is their very broad spectrum in that they will kill all insect infestation in a given area. This characteristic is not an unmixed blessing because many times it is desirable not to kill certain insects. An example is the use of lady bugs deliberately spread in an area for the control of scale insects or the two-spotted thrip for the control of red spider. The botanicals not only have the advantage that they are completely non-toxic to warm-blooded life or ingestion, but they show the ability to selectively kill desired insects when suitably formulated. If a wide range of kill is desired such botanicals as pyrethrum, for example, can be selected. On the other hand cinerin I, which is one of the pyrethrum fractions, is limited in its kill and it is known that still other botanicals have this limited effect. It is thought that on further research large numbers of botanicals of narrow spectrum can be developed so that an insecticide composition may be tailored to a specific need and concomitantly that insecticide will be substantially non-toxic to warm-blooded life. Moreover, no evidence has been uncovered to show that any of the botanicals have a carcinogenic characteristic. Indeed, such study as has been made indicates that they break down on ingestion and no fraction remains in the body which could be considered carcinogenic in its action.

When insecticides are combined with comminuted materials of the type referred to as wettable powders or with dusts used directly for spreading the common practice is to attempt to select a dust material which is compatible, so far as is known, with the insecticide which is to be incorporated with it. It is then the practice by means of this particular dust to produce a concentration which is later mixed with an aqueous material to produce a sprayable emulsion or with additional dust material to produce a dust of lower concentration for direct application to growing crops. Common dusts used for producing a concentrated dust are powdered attapulgite clay or powdered diatomite. The diatomaceous earth is either untreated or, if it is treated, it is either calcined or washed with a mineral acid. At times it may be both calcined and washed. In any event the diatomaceous earth, treated or untreated, in accordance with present practice is preferably of relatively large particle size. The dust used for diluting the wettable powder concentration will vary, but common dusting materials are sulfur, lime, chalk, talc, bentonite, mica, montmorillonite, vermiculite and the like. The properties of the diluents are selected so that the dust gives maximum coverage with minimum drift. Thus diatomite is very seldom used as a diluent, but in instances where it is so used it is almost always calcined and preferably is of relatively large particle size to prevent drifting. This approach has not been satisfactory because no suitable carrier has been developed for use with botanicals; even phosdrin, a modern toxic insecticide, cannot be formulated in accordance with general practices because there is no carrier available which will not result in degeneration of the phosdrin itself.

The principal object of my invention is the perfection of an improved carrier for insecticides.

Another object is the perfection of an improved carrier for the botanical insecticides.

Still another object of my invention is the provision of an improved insecticidal composition which will be non-toxic to warm-blooded life or, if toxic per se, of such character that the toxic effect will be greatly diminished.

A further object is to obviate the use of carcinogenic insecticides while still controlling infestation in growing crops and therefore without limiting the expected yield of the treated crops.

I have found that diatomaceous earth alone has a very strong insecticidal action, as disclosed in my copending application, Ser. No. 773,562 filed November 13, 1958, now abandoned. Thus, for example, I have found that if finely divided particles of diatomite are air floated and a container such as a Mason jar merely passed through the resulting thin, smoke-like air that exposure to the air in such jar will normally kill most insects. Indeed, flies exposed to the air in such a jar for a very short time, from 15 seconds to 5 minutes, and then transferred to a clean jar will die in a few hours, depending upon the length of their exposure. Use of untreated powdered diatomite as an insecticide has some limitations, however, because it is not possible under all circumstances to maintain the insects in contact with the insecticide. When powdered diatomite is very thinly spread on the surface of seeds during storage, as disclosed in my copending application, Ser. No. 803,824 filed April 3, 1959, now abandoned, death of all insects known to infest stored seeds is assured because the powdered diatomite is always in contact with the insects as long as they remain within the stored seed. I have found therefore that for this reason alone diatomaceous earth is an effective medium for the treatment of insects, particularly when it is in very finely divided form with a substantial portion of the particles of submicron size.

I have found other more cogent reasons, however, for the use of diatomaceous earth as an insecticide carrier to produce various types of formulations. These are the relatively completely inert character of silica and the fact that it is a material of organic origin and there are a relatively large number of adsorption sites susceptible to pKa control by suitable treatment of the diatomite so that the diatomite as a carrier can be made compatible with substantially any type of insect toxicant; particularly it can be made compatible with the botanicals and thus affords a means for the development of insecticidal compositions which are definitely non-carcinogenic but still markedly effective in the control of insects.

I wish to point out, by way of explanation but not by way of limitation, that the diatom skeleton found in diatomaceous earth consists substantially completely of silica, apparently laid down during its growth period, in the form of tetrahedra. Lacusine deposits, sometimes referred to as fresh water diatoms, are preferred for use in accordance with my invention; and, while the explanation which follows may apply to salt water diatoms as well, the work on which my invention was based was conducted with lake Diatomaceae.

In looking at a complete diatom skeleton under the microscope one usually sees a black, solid, exterior ring (assuming the diatom was of the generally circular shape) with a relatively large number of white spots on a dark background tied to the outer ring. On further magnification, with an electron microscope for example, these white dots will again be found to show a relatively large number of additional white dots and dark connecting structure in between them. In the black area of the diatom the material appears to be completely inorganic in the sense that a normal tetrahedron lattice appears to exist with successive tetrahedra facing in opposite directions. In the ultimate small white dots seen under maximum magnification, the tetrahedra appear to be floating in an unstable manner in that all the apices of the tetrahedra point toward the center of the small white dot. I have postulated that it is at this area that the siliceous shell was attached to the protoplasm of the living organism and obtained is material for growth of the shell structure. These dot-like areas which show additional dots under further magnification are approximately 461 angstrom units in width and the very small dots are approximately 10–12 angstrom units in width. For further simple identification I shall refer to these smaller dots as comprising unstable areas. It is at these areas that defects occur which I postulate as comprising the point of growth of the silica shell structure. I have found that when diatomite is calcined this unstable area disappears, probably by the center-orbited tetrahedra migrating to the exterior of the circle which they occupy and attaching themselves by fusion or extension of the normal lattice. I find also that treating the diatomite with a strong mineral acid has a similar, if not identical, effect.

In accordance with the main features of my invention I treat the diatomite with a dilute solution of a mild acid to precondition the diatomite. This may be carried out before or after grinding. It is my conception, apparently borne out by the available evidence, that the mild acid attaches itself to the diatomaceous earth at these points of defect as well, of course, as neutralizing any free lime or other alkaline materials which may be present. The excess acid is driven off at approximately the temperature of its boiling point, making use of the adsorption isotherm curve to control the process. The diatomaceous earth when ground is then ready for further steps of the process, but without further treatment comprises a valuable article of commerce for use in compounding insecticide compositions.

*Example 1*

According to one example of my invention I take a bath of diatomite which has been freed of the detritus as mined and wet it down with an excess of a 3% solution of acetic acid to absorption saturation. The amount of acid solution used should not be enough to form a slurry, merely enough to wet down the mass thoroughly and throughout the entire batch. The entire mixture is then dried at a temperature of between 118–119° C. to drive off all the water and excess acid not combined or adsorbed. The adsorption isotherm curve can be utilized in the control of this portion of the reaction. In the case of acetic acid, as long as the temperature remains in the neighborhood of 118–119° C., the adsorbed acid will normally not be driven off.

After drying, 10 gms. of the treated diatomite is leached with 100 mls. of distilled water and the pH then measured. To be sure that a good leach is prepared, the diatomite preferably should be flushed and agitated in the water, but allowed to set for a few minutes and the water then filtered off. If the filtrate shows a pH of between 6.5 and 7, the pKa at the surface of the diatomite will be about 6 to 6.5. In all cases I prefer that the pKa be below 7 and, depending on specific formulation, sometimes still lower. A table of the relationship of the pH of leaching water treated in this fashion to the pKa of the treated diatomite may be readily prepared for control purposes. In this connection I wish to point out that from batch to batch of diatomite there will be a slight difference in the relationship of pH to pKa in accordance with this treatment and control, but normally this difference will not be sufficiently great to prevent complete standardization.

Those skilled in the art will understand the method of pKa determination, but in general it comprises the use of a solid dye or dyes in a solvent other than water, and a determination by the color when applied to the material of the actual pH of the surface of the material under study. Generally the pKa is considerably lower than the pH determined by water solution methods. The pKa determined on the diatomite relates to the area of the structural defects which, without pretreatment with an organic acid, are almost always of a value above 7.

Generally speaking, diatomaceous earth as mined and freed of detritus will show an alkaline reaction because of lime impurities present with it. Occassionally a relatively pure diatomite as mined will show a pH under 7. This lower pH results from the enviroment in which it is found, and frequently is explainable by the presence of admixed acid-reacting materials such as humic acid. Invariably, however, even when the diatomite shows an acid pH on leaching with water, the areas of defect will have a pKa above 7. I wish to point out also that at times, because of environmental conditions such as pressure when diatomite is converted to a cement rock type of material, when it has become calcined because of natural occurrences or because of other occurrences, the diatomaceous earth under magnification will not show the familiar faults discussed hereinabove and is therefore not suitable for use in the practice of my invention.

I have found that almost any relatively low molecular weight, relatively weak organic acid which will not destroy the unstable areas postulated hereinabove may be used in the practice of my invention to precondition the diatomite. Such acids may be single chain, branch chain, substituted, saturated or unsaturated, monohydric or polyhydric, and may in fact appear to be chemically completely unrelated but they seem to be usable in connection with the practice of my invention. Thus I have successfully used citric, tartaric, lactic, propionic, maleic, succinic, malonic, butyric and the like acids. In the case of such products as lactic acid, acetic acid and the like I may use relatively pure sources which have been subsequently diluted, or diluted naturally occurring wastes which have been subjected to acid fermentation such as by the treatment of milk whey. The acid used also may be of a type to supply more than a single property to the resulting insecticide composition. Tannic acid, for example, can be successfully used to precondition the diatomite, but it also has a desirable effect as an antioxidant where such insecticides as pyrethrum and rotenone extracts are used. Chrysalic acid has an additional effect as an attractant where this property is desired, and certain other acids such as phthallic acid and some of its derivatives have some effect as synergists with certain type of insecticides. Still other acids which may be used to control pKa and to impart other properties are acrylic, butyric, bellaric, caproic and the like. While in general the organic acid should not contain in excess of 12 carbon atoms, some of the higher molecular weight acids may be incorporated at times either alone or with lower molecular weight acids, depending upon the insecticide to be used, such as oleic, stearic, linoleic, linolanic and the like acids.

The material as prepared above is now ready for adsorption of, for example, pyrethrum or any other of the botanicals which are of an acid nature such as carboxylic acid. Such botanicals are subject to a number of destructive factors, the worst of which is alkalinity which has been provided against by the conditioning described. Mineral acids or those of much greater activity than the carboxylic acid will also destroy them. Whatever material is used to prepare the diatomaceous earth for the reception of the toxicant must be within a chemically compatible range. The other destructive forces which act upon these organic toxicants are hydrolysis, photolysis, catalysis, and oxidation. Many effective anti-oxidants have been suggested and found but such anti-oxidants do not solve the problems of photolysis and hydrolysis. I have solved the problem of hydrolysis through the use of silicones as illustrated in an example cited hereinbelow, and through the utilization of ethylene oxide condensation products of fatty amines. The problem of photolysis is only partially solved at present. I have obtained fairly good results by the use of a combination of finely divided carbon when silicones are used in the formulation. While photolysis still presents problem areas, additional work is progressing. The great advantage of my invention is that I provide an environment in which the various factors affecting useful life of the organic toxicants may be manipulated, and provide means to control such environment as required.

In accordance with the general features of my invention I may incorporate a relatively large amount of the insect toxicant with remaining modifying materials into a treated diatomite to prepare a wettable powder which may be used as such, mixed with additional dust as a diluent for crop dusting, or dispersed in water to form an emulsion or suspension. I have successfully prepared stable emulsion compositions comprising pyrethrum by this means when, to the best of my knowledge, it has heretofore been impossible to obtain any significant residual when using pyrethrum in this fashion.

In prepared formulations in which pyrethrum, rotenone, sabadilla, rynia and the like botanical materials are adsorbed by the pretreated diatomite, the shelf life of such material, so far as I have been able to determine, is indefinitely long. The pyrethrum or the like also may be introduced in relatively smaller proportions on the pretreated, very finely comminuted diatomite and sprayed or dusted on open fields. Residuals of 30 days or more have been obtained in this fashion, when heretofore pyrethrum residuals of a few hours have been considered the maximum to be expected. Very strong sunlight, such as in Arizona in the summer time, will reduce this result; but this is a sunlight or photolysis problem not directly related to control of environment in the formulation.

When the vary finely divided diatomite is treated with an insect toxicant and modifying substances used as described hereinabove and as illustrated by following examples, it is desirable to treat the resulting product with a relatively volatile, compatible, non-aqueous material to cause the smaller particles to coalesce into relatively larger floes and thus avoid drifting during a dusting process. A preparation prepared in this manner has the insect toxicant associated with each very fine particle so that much greater distribution is made possible and the total amount of toxicant used may be reduced. This condition is to be compared with the existing practice in which relatively large particles of a substance like attapulgite clay are used to absorb relatively large amounts of the toxicant, and the diluting dusts comprising 60–80% of the dust as applied have no toxic substance associated with them. To cause particle flocculation a high boiling point oleaginous material of +60 kauri-butanol is satisfactory, and mono- to di- or tri-ethylene glycol is equally effective due to its low evaporation rate. Practically any non-reactive organic of low evaporation rate is satisfactory for this purpose. When these larger flocs strike the plant the particles, being loosely held together, generally will spread and give substantially the same effect as if they had been applied in the form of very finely divided dust.

*Example 2*

In accordance with another manner of practicing my invention, 99.27% of the product prepared in accordance with Example 1 is intimately mixed with .03% active pyrethrum extract, .6% Ethomeen/25 (Armour & Co.), and .1% tannic acid dissolved in 20 times its own weight of ethyl alcohol. The pyrethrum is in the form of a commercial fluid extract of 23% strength, and the tannic acid is used in the form of an ethyl alcohol solution comprising one part of tannic acid to 20 parts of ethyl alcohol. The commercial Ethomeen is a product comprising an ethylene oxide condensation product of a fatty amine. In compounding the mixture, all the liquid ingredients are mixed together and sprayed onto the treated diatomite as it is being constantly agitated, for example, during milling. The product so produced can be used directly in a dry condition for dusting either with or without flocculation, depending upon conditions of use, or it can be used as a wettable powder with which to produce an emulsoid suspension for use in liquid spraying apparatus. Due to the highly abrasive nature of the diatomite, it is preferable that a centrifugal pump be used in spraying an emulsoid suspension comprising this material.

The pyrethrum extract referred to in the preceding example is the complete extract containing conventional amounts of the four active ingredients, namely, pyrethrin I, pyrethrin II, cinerin I, and cinerin II. Analogs of these two latter substances have been prepared synthetically with considerable expectation of producing at a relatively low price an effective non-carcinogenic product non-toxic to warm-blooded life when ingested, and also to free the country from dependence on foreign sources of pyrethrum extracts which have not always been dependable either from the standpoint of economy, availability, or potency. The U.S. Department of Agriculture made important contributions to the synthesizing of these two materials. One of these, allethrin, has been marketed to a considerable extent and, while it is usable in some specific formulations with other toxicants, it has a great disadvantage in that it is so highly volatile that its residual action is extremely low. One of the very important advantages of my invention is that I have been able to obtain substantially the same residual action over substantially the same period of time with allethrin as with the naturally-occurring pyrethrum extract comprising the four ingredients. Based upon this experience there is reasonable ground for believing that many known botanical insecticides which are unavailable in commercial quantities can be synthesized and used advantageously in the control of insect pests.

*Example 3*

In accordance with another example, I preconditioned 98.74 parts of very finely divided diatomite with whey containing 1.5% lactic acid to which 1.5% acetic acid had been added. After being thoroughly mixed in a progressive rod mill the material was gathered at the discharge end and dried at 120° C. until all the water and the excess acid had been driven off. The resulting pretreated powdered diatomite was then intimately mixed with .06% allethrin, .6% of a synergist sold by McLaughlin, Gormley & King as #264, and .6% methyl silicone dissolved in a petroleum solvent. The allethrin used was in the form of a 10% commercial solution; the silicone, a Dow-Corning product, was dissolved in a petroleum solvent of +60 kauri-butanol. As in the previous example, a very intimate mixture was obtained by grinding in a ball mill.

The resulting product has been used with very great success in the control of flies. In this use it is dusted, for example, on all available parts of a dairy, even the cows being covered with the dust. I have treated some forty dairy installations with this dust, repeating the spraying at more frequent intervals—say once a week—until the flies are under control and at longer intervals when control has been established. I have found that where deaths occurred as a percentage factor of the herd and were a continuing substantial percentage of the calf crop when the artificial synthetic toxicants were being used, after I took control with the above example the losses in the calf crop ceased and the losses in the adult herd were only the normal mortalities of age and fortuitous circumstances, a definite decrease from the previous state of affairs.

When using the dusting method described hereinabove and the product of the last described example, the result with flies is that very few flies will be seen in any part of the dairy. This is to be contrasted with methods employing toxicants where the fly population will increase to a maximum at a very rapid rate and in which, after spraying, large numbers of dead flies will be found in barns and other areas where the spraying has occurred. One of the most important aspects of this type of control is that statistically in the state of Arizona milk production decreases an average of 15% during hot summer months. In the 40-odd control dairies where my method was used, the maximum decrease in milk production was of the order of 3%, while in some dairies no discernible loss in milk production was found.

*Example 4*

In accordance with another example, I pretreated 93.5 parts of powdered diatomite to produce a pKa of 6 and intimately mixed therewith 1% of di-n-butyl succinate, 3% oleic acid, .03% allethrin, .3% of a commercial synergist, and .3% methyl silicone. As in previous examples, suitable solvents were used and the liquid ingredients admixed before introduction into the ball mill. In this particular form the butyl succinate has a strong insect repellant action, and the oleic acid has the effect of stabilizing it against rapid evaporation in contact with air and bright sunlight. This particular preparation was found very effective for direct dusting onto cattle, especially in the early part of the treatment to control flies. Absolutely no undesirable effect occurs with the cattle, flies are retarded, and such other insects as were found in contact with the cattle were for the most part completely eliminated.

*Example 5*

In accordance with another example of my invention I have produced a product particularly effective as a spray comprising 50 pounds of acid-conditioned powdered diatomite showing a pKa of 6, .04% pyrethrum extract in a solvent (general use type product), 1 oz. of tannic acid, 200 ml. silicone, 100 ml. of a petroleum solvent of +60 kauri-butanol type, 150 ml. of commercial pyrenone (a commercial mixture of piperonyl butoxide and 6% pyrethrin). This product formed a wettable powder readily dispersed in water. It is very effective as a plant spray and exhibits longer than common residual action of the pyrethrum constituents.

*Example 6*

In accordance with yet another example I produced a wet spray suitable for the control of aphids by mixing together 2.5 gms. of tannic acid, 71 ml. of ethyl alcohol, 20 ml. methyl silicone, 15 ml. pyrenone, and 3 gms. rotenone dissolved in 50 gms. of ethyl alcohol. The above mixture was intimately combined by violent agitation with 5 pounds of very finely divided, preacid-reacting diatomite powdered in accordance with my invention as disclosed hereinabove and illustrated in Example 1. The resulting product comprising a mixture of pyrethrins and rotenone dispersed readily in water and formed an effective spray material with good covering action on the underside of leaves and along the stems of plants where aphids are found. Its insecticidal action continued for a period of time substantially in excess of that obtainable with pyrethrum products of the prior art. While I was not able to establish provable quantitative data, the insecticidal action of the pyrethrins and rotenone appeared to be present for at least approximately 30 days.

These same techniques described and exemplified above may be utilized for the compounding of the artificial synthetic toxicants, even those with a benzoid ring structure which are known to be carcinogenic. While I have formulated compounds utilizing even such unstable volatiles as Phosdrin, which otherwise has not been applied successfully to a dust or carrier, we have made no field applications of these materials, but only laboratory controlled tests. The principal objective of my invention obviously has been to make available means for utilizing non-toxic, non-carcinogenic materials rather than to further the undesirable present trend of the use of toxic and carcinogenic materials.

*Example 7*

As an example, commercially available Phosdrin was combined with alcohol and silicone in the same proportions as in the pyrethrum example given above, and adsorbed in percentages of from .5% to 5% onto the pretreated acid pKa diatomite of my invention, and water emulsions formed with the resulting products. Residuals up to 30 days at the lower percentages were obtained. This is very illustrative because Phosdrin normally is given a half-time life of 5 days when used in water emulsions.

Even though I have directed my attention primarily to the use of non-carcinogenic insecticides and particularly to the known botanicals such as pyrethrins, rotenone, sabadilla, ryania and the like, the use of my invention to stabilize and make effective relatively much smaller percentages of the synthetic toxicants of suspected carcinogenic character makes possible improvement in this aspect of the industry pending the development of fully effective botanicals and other noncarcinogenic toxicants capable of effectiveness over the entire insect spectrum. Moreover, I have found that with my invention it is possible to use successfully practically all the toxicants, synergists, attractants, repellants, and other alleged beneficial substances usually to greater advantage than heretofore possible because of the greatly improved environment I have made available to those skilled in the art.

While I have described my invention in considerable

I claim:

1. In the preparation of an insecticide composition, the steps of treating diatomaceous earth with a water solution of a relatively low molecular weight organic acid containing not in excess of twelve carbon atoms, removing the water and excess acid by evaporation to produce a pKa of less than 7 at the site of structural defects in the diatom, comminuting the diatomaceous earth at a suitable time in the course of its preparation to produce particles at least 90% of which are less than 10 microns in size, and treating the resulting diatomaceous earth product with a botanical insecticide of the class consisting of pyrethrum, rotenone, sabadilla and ryania.

2. In the preparation of an insecticide composition, the steps of treating diatomaceous earth with a water solution of a relatively low molecular weight organic acid containing not in excess of twelve carbon atoms, removing the water and excess acid by exaporation to produce a pKa of less than 7 at the site of structural defects in the diatom, comminuting the diatomaceous earth at a suitable time in the course of its preparation to produce particles at least 90% of which are less than 10 microns in size, and treating the resulting diatomaceous earth product with a botanical insecticide and a silicone resin material for preventing hydrolysis of the said botanical insecticide.

3. In the preparation of an insecticide composition, the steps of treating substantially pure naturally occurring powdered diatomite with a water solution of a relatively low molecular weight of organic acid containing not in excess of twelve carbon atoms, heating the resulting product sufficiently to drive off the water and excess acid to leave a residue having a pKa of less than 7, and then intimately mixing said diatomaceous earth product with a pyrethrum insecticide.

4. In the preparation of an insecticide composition, the steps of treating substantially pure naturally occurring powdered diatomite with a water solution of a relatively low molecular weight organic acid containing not in excess of twelve carbon atoms, heating the resulting product sufficiently to drive off the water and excess acid to leave a residue having a pKa of less than 7, and then intimately mixing said diatomaceous earth product with a pyrethrum insecticide and a product of the class consisting of silicone resin and ethylene oxide condensation products.

References Cited by the Examiner

UNITED STATES PATENTS

| | | | |
|---|---|---|---|
| 1,492,184 | 4/24 | Weir | 252—450 |
| 1,752,721 | 4/30 | Bierce | 252—450 |
| 2,177,197 | 10/39 | Cummings | 167—14 |
| 2,640,756 | 6/53 | Wills | 167—14 |
| 2,724,653 | 11/55 | Todd | 167—14 |
| 2,923,095 | 2/60 | Pelonnier et al. | 47—58 |

OTHER REFERENCES

Bartlett: J. of Economic Entomology, December, 1951, pp. 891–895.

Gnadinger: "Pyrethrum Flowers," published by McLaughlin Gormley & King Co., Minneapolis, Minnesota, 2nd Ed., 1937, p. 247.

Miller: Agr. Chem., November 1950, pages 43–45 and 78.

Osol: U.S. Dispensatory, 24th Ed., 1947, J. B. Lippincott Co., pages 1035 and 1036.

JULIAN S. LEVITT, *Primary Examiner.*

MORRIS O. WOLK, WILLIAM B. KNIGHT, LEWIS GOTTS, *Examiners.*

UNITED STATES PATENT OFFICE
CERTIFICATE OF CORRECTION

Patent No. 3,207,662 September 21, 1965

A. Louis de Lisle

It is hereby certified that error appears in the above numbered patent requiring correction and that the said Letters Patent should read as corrected below.

In the grant, line 1, for "A Louis de Lisle" read -- A. Louis de Lisle --; line 11, strike out "the said"; line 12, for "A Louis de Lisle, his heirs" read -- Phoenix Gems, Inc., its successors --; in the heading to the printed specification, line 4, for "A Louis de Lisle, Phoenix, Ariz." read -- A. Louis de Lisle, Phoenix, Ariz., by Frances S. de Lisle, executrix of the estate of said A. Louis de Lisle, deceased, assignor to Phoenix Gems, Inc., a corporation of Arizona --.

Signed and sealed this 19th day of April 1966.

(SEAL)
Attest:

ERNEST W. SWIDER
Attesting Officer

EDWARD J. BRENNER
Commissioner of Patents